United States Patent [19]

Lian

[11] Patent Number: 4,978,831
[45] Date of Patent: Dec. 18, 1990

[54] CARBON DIOXIDE WELDING GUN

[76] Inventor: Jon C. Lian, No. 8-6, Chung Chen E. Rd., Tansui, Taipei Hsien, Taiwan

[21] Appl. No.: 454,391

[22] Filed: Dec. 21, 1989

Related U.S. Application Data

[63] Continuation-in-part of Ser. No. 255,462, Oct. 11, 1988, Pat. No. 4,945,208.

[51] Int. Cl.$^5$ .............................................. B23K 9/24
[52] U.S. Cl. ................................................ 219/137.61
[58] Field of Search ...................... 219/137.44, 137.52, 219/137.61

[56] References Cited

U.S. PATENT DOCUMENTS

| | | | |
|---|---|---|---|
| 3,529,128 | 9/1970 | Cruz, Jr. ........................ | 219/137.44 |
| 3,825,720 | 7/1974 | Zillinger, Jr. .................. | 219/137.44 |
| 4,560,858 | 12/1985 | Manning ........................ | 219/137.44 |

Primary Examiner—Clifford C. Shaw
Attorney, Agent, or Firm—Asian Pacific International Patent Trademark

[57] ABSTRACT

The present invention relates to an improved carbon dioxide welding gun which is equipped with a two-piece bushing mechanism where a welding rod guide member is easily detached or inserted into operative condition in an efficient manner. The two-piece bushing mechanism includes a front conical tip member and a rear support member which are releasably secured each to the other by means of threaded sections. In this manner, the welding gun of the subject invention concept prevents accumulation of carbon residues so that the service life of the overall system is extended.

1 Claim, 6 Drawing Sheets

CARBON DIOXIDE WELDING GUN

This application is a continuation-in-part of copending application Ser. No. 255,462 filed Oct. 11, 1988 now U.S. Pat. No. 4,945,208.

BACKGROUND OF THE INVENTION

The subject invention relates to an improved carbon dioxide welding gun, and more particularly to a welding rod guide which is constructed and arranged to provide a twopiece bushing which is easily and quickly removed or assembled into operative condition.

The welding rod guide in prior art carbon welding guns is arranged in a protective casing of the welding gun. Due to the fact that prior art guides utilize a flat orifice, carbon residues may accumulate around the tip ends of the guides during a welding operation. Further, high temperatures resulting from the welding operation may reduce the hardness of such prior art copper composition guides so that the orifice of such guides may be enlarged while the welding rod is penetrating through the central passage of the guide. Therefore, the guides of conventional welding guns must be replaced in a matter of hours during continuous welding operationgs. Due to these reasons, the guides of such prior art carbon dioxide welding guns are not overly practical and provide a less economical effect to the user when taken with respect to the subject invention concept system.

Still further, in the replacement of prior art guides the outer protective casing must be initially detached and then the connector beyond the cable must be loosened to allow the inner welding guide to be removed for replacement. This is very complicated procedure which is time consuming and increases the welding process costs.

With respect to the aforementioned inconveniences and disadvantages. The subject system provides an improved carbon dioxide welding gun which provides an efficient operation and performance criteria.

The main object of the subject invention is to provide an improved carbon dioxide welding gun which prevents accumulation of carbon residues and extends the service life of the welding gun. Additionally, there is provided a two-piece bushing mechanism to interface with the welding guide so that the welding guide may be detached or set up into operative condition in an efficient manner.

SUMMARY OF THE INVENTION

An improved carbon dioxide welding gun which comprises a front conical tip member, an elongated guide member for a welding rod, and an elongated cup-like support member for the guide member. End sections of the tip member and support member are threaded so that the two members can be detachably connected together in surrounding relation to the guide member. The combined tip member and support member define a bushing mechanism whereby the welding rod guide member is easily removed or inserted for operative efficiency.

BRIEF DESCRIPTION OF THE DRAWINGS

The above and other objects, features and advantages of the present invention will be fully understood from the following description considered in connection with the accompanying drawings which illustrate the best mode of practicing the invention.

FIGS. 24 and 2B are exploded perspective and sectional views of a welding rod guide structure embodying the present invention.

DESCRIPTION OF THE PREFERRED EMBODIMENTS

Figure 1:
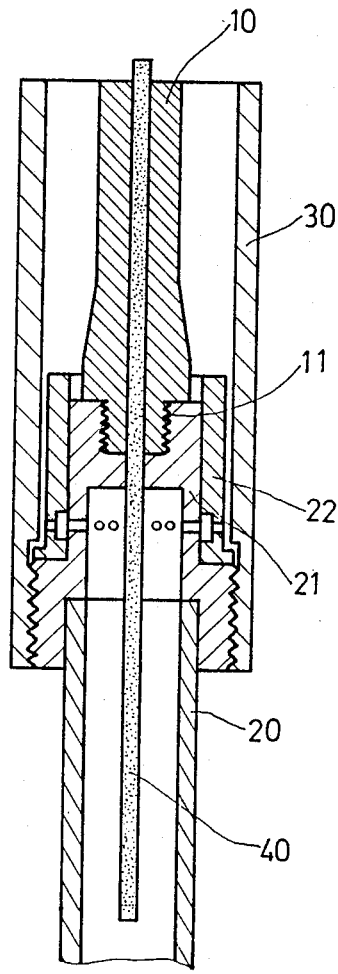
FIG. 1 is a sectional view of the prior art welding nozzle which is commonly used.

Referring now to FIG. 1, there is shown a sectional view of prior art and conventional welding nozzle type constructions. In such conventional systems, there is provided protective casing 30 which is connected to cable 20 which is initially detached. Subsequent to this type of procedure, connector 22 is mounted external to current contact tube 21 on a frontal portion of cable 20 is loosened and removed. After this procedure, welding rod guide 10 is attached to current contact tube 21 via threaded connector 11. Connector 22 is connected to current contact tube 21. Welding rod 40 is then inserted through a central portion of current contact tube 21 and connector 22. As is seen, guide 10 extends in an outward manner with respect to connector 22. Outer protective casing 30 is threaded to connect with cable 20 to complete the overall assembly of nozzle 10. In removing guide 10 from the overall structure, a reverse sequence is initiated which is extremely complicated and inconvenient to perform on an operational basis. Further, carbon residues produced during the welding process generally stay at the end surface around the orifice of guide 10 with a deteriorating effect to the welding process. During the welding operation the gun is running at an extremely high temperature and welding rod 40 is being continuously fed outward through the hollow portion of guide 10. Thus, the orifice of guide 10 is gradually enlarged and interferes with the welding process with a subsequent deterioration of the service life of the conventional welding gun.

Figure 2A:
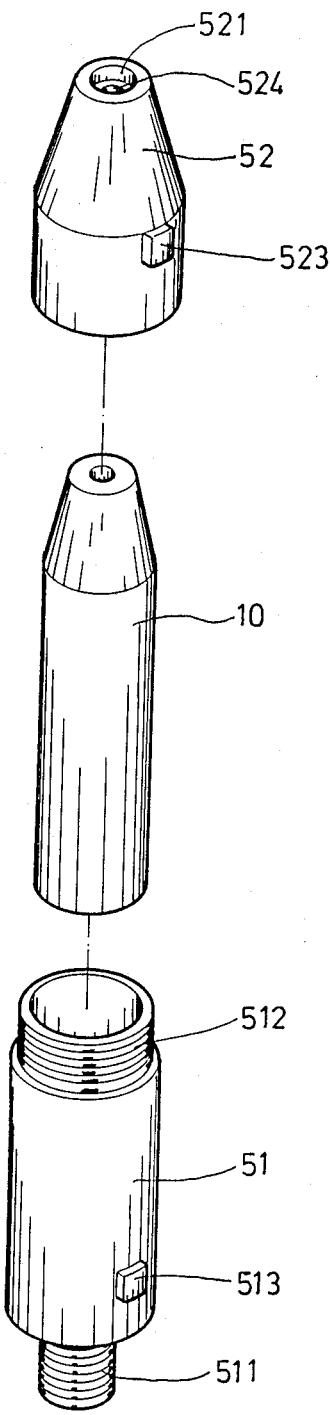
Figure 2B:
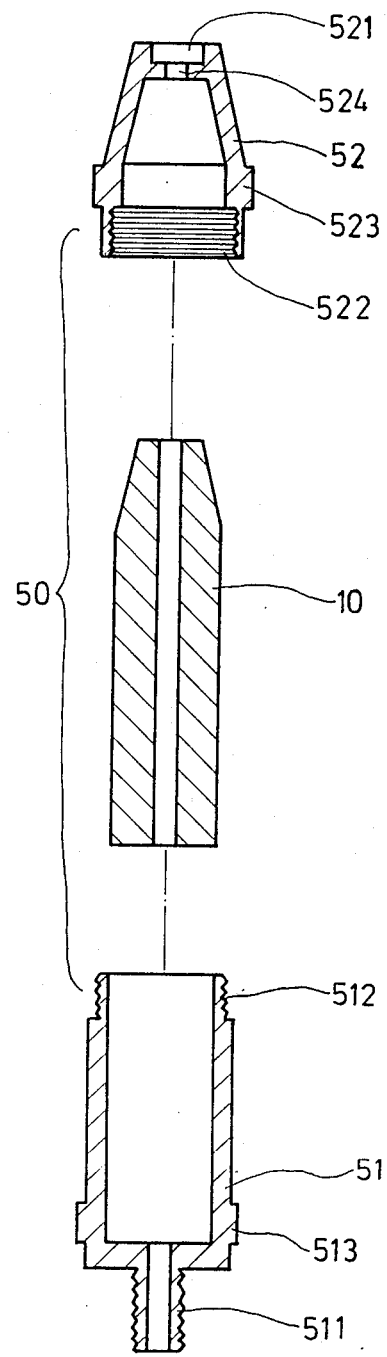

Referring now to FIGS. 2A and 2B, there is shown a two piece bushing mechanism 50 which has inserted therein and interfaces with a welding rod guide member 10. Two piece bushing mechanism 50 includes from conical member 52 and rear support member 51, each threadedly secured to the other, as will be described in following paragraphs.

Rear support member 51 is configured in a hollow cupshaped configuration having a through passage, as is clearly seen. Rear member 51 is threadedly coupled to front conical head member 52. Rear conduit member 51 includes a hollow cylindrical configuration defining first male threaded connector portion 512 at an upper section and second male threaded connector portion 511 formed at a lower section, as is seen in FIG. 2. Second connector portion 511 includes a diameter substantially less than the diameter of first connector portion 512. A pair of lug members 513 are formed on opposing sides of rear member 51 at a lower portion thereof, as is seen.

Figure 3A:
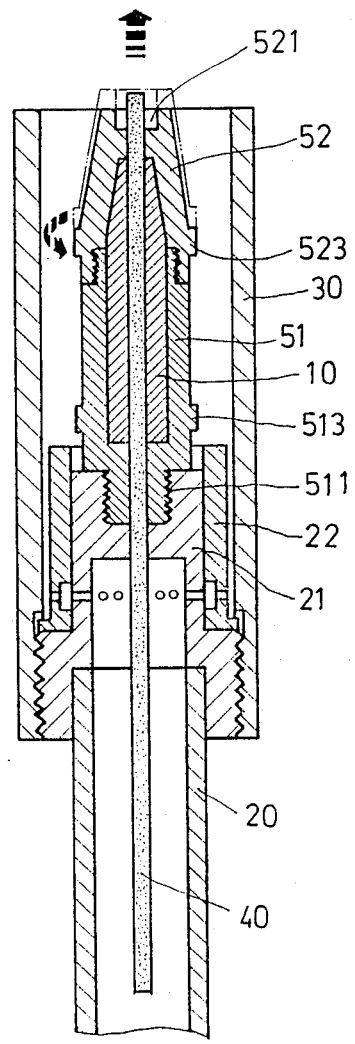
FIG. 3A is a sectional view of the subject improved welding rod guide structure showing a conical tip member being threadedly secured to support member.
Figure 3B:
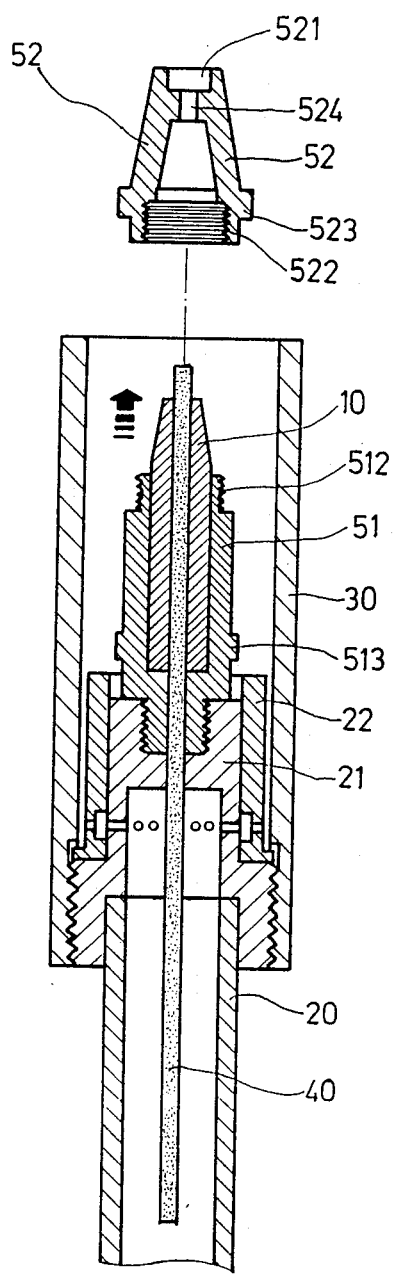
FIG. 3B is a sectional view of the subject invention system showing the first conical tip member being removed from the rear support member.

As is detailed, first male threaded connector portion 512 is threadedly securable to female threaded connector section 522 of front conical tip member 52, as is seen in FIGS. 3A, 3B.

Front conical member 52 includes a through passage and ring groove or recess 521 formed in its top end surface to prevent accumulation of carbon residues, a welding rod hole (524) with murdered length formed under ring groove 521, and an internal truncated conical configuration fitting the guide member (10) as shown in FIG. 2. Front conical member 52 has an internal truncated conical configuration. A pair of head lug members 523 re located on opposing sides at a rear and of conical member 52.

Welding rod guide member 10 is insertable within support member 51 and front conical member 52. Welding rod guide member 10 includes an upwardly projecting conical configuration for mating and interfacing relation with the internal truncated conical configuration of first conical head member 52.

Figure 4:
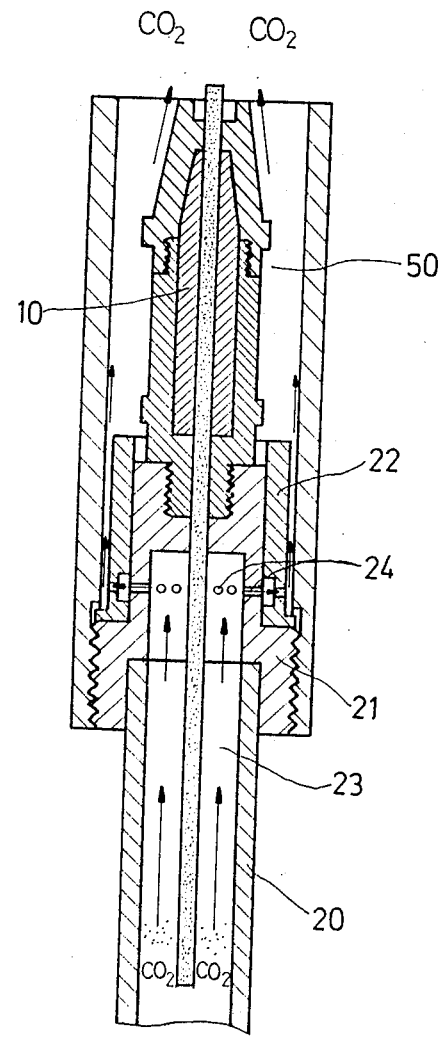
FIG. 4 is a sectional view of the subject system illustrating the operation during the welding process.

As shown in FIGS. 3A, 3B and 4, conical member 52 is threadedly engaged to rear conduit member 51 by threaded securement of connector sections 512 and 522, as is shown.

In this mamner, simple connection and detachment of the overall assembly may easily be accomplished by simple threaded securement or threaded removal of first conical member 52 and rear member 51.

Referring now to FIGS. 3A, 3B and 4, the welding rod guide member 10 of the subject invention clearly is seen to have a smooth and continuous surface at a bottom section unlike the conventional guide member shown in FIG. 1, which includes a threaded connector. Initially, prior to beginning the assembly of member 10, outer protective casing 30 is removed from current contact tube 21 located in front of cable 20 in order to allow support member 51 to be threaded with current contact tube 21 by threaded connector 511.

Connector 22 is thereafter attached to the welding gun in order to allow member 51 and current contact tube 21 of cable 20 to be securely coupled each to the other. Subsequently to this operation, guide member 10 is inserted into the hollow space volume internal to member 51. Conical tip member 52 is attached to member 51 by threading female connector portion 522 with male connector portion 512. In a final step, outer protective casing 30 is attached to current contact tube 21 of cable 20 by means of the bottom circular groove formed in protective casing 30 to lock with connector 22 resulting in a completed assemly.

Welding rod 40 penetrates through aligned central passages in members 21, 51, 10 and 52 to continuously feed welding rod 40 during the welding operation.

When the welding operation is terminated, guide member 10 may be replaced or removed in a simplified manner. Outer protective casing 30 does not have to be removed during this operation. Front conical tip member 52 of bushing mechanism 50 is detached by inserting a standard screwdriver type tool into outer protective casing 30 to pry lug members 523 in a manner such that guide member 10 can be removed in an efficient manner.

Referring to FIG. 4, during the welding process, carbon dioxide gas runs through inner air passage 23 of cable 20 and air holes 24 of current contact tube 21. The carbon dioxide gas passes out of the welding gun through the circular groove surrounding connector 22. Thus, during the welding process, carbon residues produced are sprayed away. Due to the fact that bushing mechanism 50 of the present invention is made of suitable steel-like material composition and the conical tip member 52 of the bushing mechanism 50 is chrome plated. the carbon residues do not remain near the conical tip member 52 of bushing mechanism 50. Thus, during the welding process, Performance of member 10 of the subject welding gun is not interferred with by carbon residues and with a resulting increase in the service life of member 10.

In overall concept, the present invention is directed to a two-piece bushing which facilitates the assembly or detachment of member 10 in order to prevent accumulation of carbon residues and to extend the service life of a carbon dioxide welding gun.

What is claimed is:

1. In a carbon dioxide welding gun, the improvement comprising:

an annular support member (51) for a welding rod guide member; said support member comprising an axially elongated cup-shaped portion having an externally threaded section(511) at one end thereof for mounting the support member in a welding gun and an externally threaded section(512) at its other end;

an annular welding rod guide member 10 seated in the annular cup-shaped portion of the support member; said guide member having a portion thereof projecting axially beyond the support member, the projecting portion of the electrode guide member having a frusto-conical external surface; and an annular contact tip member(52) fitting onto the projecting portion of said guide member; said tip member having a frusto-conical internal surface mated to the external surface contour on the projecting portion of the guide member, a first internally threaded end section (522) having meshed engagement with the externally threaded section of the annular support member, and a second end section having an external recess (52) facing axially away from the guide member;

said support member, guide member, and tip member having axially aligned passages extending therethrough for slidable accommodation of a welding rod; the tip member having its external recess(521) in near adjacency to the consumable end of the welding rod during normal usage of the welding gun.

* * * * *